(12) United States Patent
Kalenborn (10) Patent No.: US 9,926,861 B2
(45) Date of Patent: Mar. 27, 2018

(54) TWO-FUEL INJECTION SYSTEM AND IMPLEMENTATION METHOD USING SAME

(71) Applicant: L'ORANGE GMBH, Stuttgart (DE)

(72) Inventor: Markus Kalenborn, Dornstadt (DE)

(73) Assignee: L'ORANGE GMBH, Stuttgart (DE)

( * ) Notice: Subject to any disclaimer, the term of this patent is extended or adjusted under 35 U.S.C. 154(b) by 0 days.

(21) Appl. No.: 15/032,260

(22) PCT Filed: Sep. 16, 2014

(86) PCT No.: PCT/EP2014/002500
§ 371 (c)(1),
(2) Date: Apr. 26, 2016

(87) PCT Pub. No.: WO2015/058822
PCT Pub. Date: Apr. 30, 2015

(65) Prior Publication Data
US 2016/0245194 A1    Aug. 25, 2016

(30) Foreign Application Priority Data

Oct. 26, 2013  (DE) .................. 10 2013 017 853

(51) Int. Cl.
*F02D 19/10*  (2006.01)
*F02M 55/00*  (2006.01)
(Continued)

(52) U.S. Cl.
CPC ....... *F02D 19/105* (2013.01); *F02D 19/0684* (2013.01); *F02D 19/0689* (2013.01);
(Continued)

(58) Field of Classification Search
CPC ............... F02D 19/105; F02D 19/0684; F02D 19/0689; F02D 19/0692; F02D 19/0694;
(Continued)

(56) References Cited

U.S. PATENT DOCUMENTS 5,622,152 A * 4/1997 Ishida ................... F02M 45/02
123/446
5,690,077 A * 11/1997 Ofner ................. F02M 21/0212
123/27 GE (Continued)

FOREIGN PATENT DOCUMENTS

DE    102006023470 A1   11/2007
WO    2007059543 A1    5/2007

*Primary Examiner* — Lindsay Low
*Assistant Examiner* — John Bailey
(74) *Attorney, Agent, or Firm* — Lucas & Mercanti, LLP; Klaus P. Stoffel (57) ABSTRACT

A dual-fuel injection system having a combustion gas-supply device and a liquid fuel-supply device, including a combustion gas-injector unit with a liquid fuel-control part and a gas nozzle part, to which combustion gas can be supplied. The stroke of a gas nozzle needle of the combustion gas-injector unit can be controlled by liquid fuel supplied to the liquid fuel-control part. The combustion gas-injector unit defines a leakage collecting space, via which a leakage path is lead, the leakage path extending from the liquid fuel-control part into the gas nozzle part. The dual-fuel injection system has a pressure-regulating device, by which a defined pressure level can be set in the leakage collecting space. An implementation method using such a dual-fuel injection system is also proposed.

15 Claims, 2 Drawing Sheets

(51) Int. Cl.
*F02M 43/04* (2006.01)
*F02M 47/02* (2006.01)
*F02D 19/06* (2006.01)
*F02M 21/02* (2006.01)

(52) U.S. Cl.
CPC ..... *F02D 19/0692* (2013.01); *F02D 19/0694* (2013.01); *F02M 21/0251* (2013.01); *F02M 21/0263* (2013.01); *F02M 43/04* (2013.01); *F02M 47/027* (2013.01); *F02M 55/002* (2013.01); *F02M 2200/16* (2013.01); *Y02T 10/32* (2013.01); *Y02T 10/36* (2013.01)

(58) Field of Classification Search
CPC .......... F02M 21/0251; F02M 21/0263; F02M 43/04; F02M 47/027; F02M 55/002; F02M 2200/16; Y02T 10/32; Y02T 10/36
USPC ............... 123/526, 515, 525, 467, 472, 506; 701/113; 239/88, 89, 90, 91, 533.8, 239/533.4, 533.3, 124, 533.11; 277/591, 277/592; 137/505.18
See application file for complete search history.

(56) References Cited

U.S. PATENT DOCUMENTS

| | | | | |
|---|---|---|---|---|
| 5,857,448 A * | 1/1999 | Ofner | ................. | F02M 21/0212 123/525 |
| 5,890,471 A * | 4/1999 | Nishimura | ............. | F02M 45/12 123/467 |
| 5,996,558 A * | 12/1999 | Ouellette | ................. | F02D 19/10 123/27 GE |
| 6,027,037 A * | 2/2000 | Murakami | .......... | F02D 41/3827 239/533.8 |
| 6,769,635 B2 * | 8/2004 | Stewart | ................... | F02M 45/02 123/299 |
| 6,843,434 B2 * | 1/2005 | Lawrence | ............ | F02M 45/086 239/533.11 |
| 6,945,475 B2 * | 9/2005 | Lawrence | ............ | F02M 45/086 239/533.2 |
| 7,134,615 B2 * | 11/2006 | Lawrence | ............ | F02M 57/025 239/533.3 |
| 7,637,252 B2 * | 12/2009 | Jung | .................. | F02M 37/0052 123/447 |
| 8,091,530 B2 * | 1/2012 | Surnilla | ............... | F02D 41/2464 123/446 |
| 8,100,344 B2 * | 1/2012 | Kondo | ................. | F02M 47/027 123/480 |
| 9,181,886 B2 * | 11/2015 | Grant | ................. | F02D 19/0694 |
| 9,482,165 B2 * | 11/2016 | Stockner | ................. | F02D 19/0694 |
| 9,518,518 B2 * | 12/2016 | Coldren | ................. | F02D 41/3836 |
| 2002/0070295 A1 * | 6/2002 | Baker | .................... | F02M 43/02 239/533.3 |
| 2007/0199539 A1 * | 8/2007 | Lennox | ............... | F02D 19/0605 123/304 |
| 2012/0080011 A1 * | 4/2012 | Cooke | ................. | F02M 45/086 123/472 |
| 2014/0238351 A1 * | 8/2014 | Haas | ................... | F02D 19/0605 123/446 |
| 2014/0311455 A1 * | 10/2014 | Kim | ....................... | F02M 43/04 123/472 |

\* cited by examiner

Fig. 1

TWO-FUEL INJECTION SYSTEM AND IMPLEMENTATION METHOD USING SAME

The present application is a 371 of International application PCT/EP2014/002500, filed Sep. 16, 2014, which claims priority of DE 10 2013 017 853.3, filed Oct. 26, 2013, the priority of these applications is hereby claimed and these applications are incorporated herein by reference.

BACKGROUND OF THE INVENTION

The present invention relates to a dual-fuel injection system particularly for an internal combustion engine. In addition, the invention relates to a method of implementation using such a dual-fuel injection system. The invention can be used, in particular, with pilot ignition engines, which besides a pilot ignition mode with fuel gas (and a diesel or heavy oil pilot ignition) also provide a pure diesel or heavy oil mode. Here bio-oil or biofuel, for example, may also be used instead of heavy oil.

Gaseous fuels are becoming increasingly important in the (large) engine sector, especially in stationary engines for power generation. Natural gas is outstandingly suitable for an economic and environmental engine operation owing to its ready availability and its more favorable potential emissions compared to diesel fuel.

In those dual-fuel injection systems of generic type which use liquid fuel for (indirect) control of the gas injector unit(s) (principle: pilot valve-actuator-control chamber), especially systems which make use of high-pressure gas injection in conjunction with a pilot injection by diesel fuel or heavy oil (or biofuel), mixed leakage regularly occurs. The gas fraction of this mixed leakage is separated in separators, wherein the liquid fuel is fed back into the tank and the gas is recompressed or is fed into the engine intake tract. One disadvantage here is that the leakage is subjected to treatment without making any distinctions with regard to the operating situation, so that consequently the cost in terms of energy is not ideal.

SUMMARY OF THE INVENTION

Proceeding from this, the object of the present invention is to specify a dual-fuel injection system and an associated method, in which any leakage occurring from the gas injector unit can advantageously be subjected to variable treatment depending on the operating situation.

According to the invention a dual-fuel injection system for a combustion engine is proposed. The combustion engine is preferably an internal combustion engine, which by means of the dual-fuel injection system can be operated both with fuel gas, in particular by the pilot ignition method (together with a pilot ignition liquid fuel (especially diesel fuel or heavy oil/biofuel)), and also in the pure liquid fuel mode, especially with diesel fuel or heavy oil (or biofuel, for example). The combustion engine is preferably a large engine, for example for a motor vehicle such as a ship or a commercial vehicle, or for a stationary installation, for example, such as a combined heating/power station, a (standby) power generator, for example also for industrial applications.

In addition to a fuel gas supply device and a liquid fuel supply device, the dual-fuel injection system comprises a fuel gas injector unit having a liquid fuel control part and a gas nozzle part, to which gas nozzle part fuel gas can be supplied (fed) (via the fuel gas supply device). Here the lift of a gas nozzle needle of the fuel gas injector unit can furthermore be controlled by liquid fuel (in particular diesel or heavy oil (or biofuel)) supplied to the liquid fuel control part (via the liquid fuel supply device).

The fuel gas supply device is preferably adapted to provide fuel gas (for example natural gas, biogas, etc.) from a fuel gas reservoir (tank) under pressure, especially under high pressure and also in particular at predefined supply pressure levels, to the fuel gas injector unit, that is to say to the gas nozzle part thereof (via a gas inlet of the fuel gas injector unit, for example). In other words, the fuel gas supply device may serve to set a first (fuel) pressure level (fuel gas pressure level) on the fuel gas injector unit, i.e. in its gas nozzle part.

In the course of a corresponding lift control of the nozzle needle via the liquid fuel control part of the fuel gas injector unit (indirectly controlled injector unit, particularly on the principle of nozzle needle-control chamber-pilot valve-actuator with liquid fuel as control fluid), the fuel gas can be released for a gas mode or pilot ignition mode, that is to say via a gas nozzle arrangement of the gas nozzle part (for example one or more nozzle holes).

Like the fuel gas supply device, the liquid fuel supply device of the dual-fuel injection system is preferably adapted to supply liquid fuel (particularly diesel fuel, heavy oil (or biofuel)) from a respective liquid fuel reservoir (tank) under pressure, especially under high pressure, to the liquid fuel control part of the fuel gas injector unit, and in this respect to allow or ensure controllability of the lift of the nozzle needle of the fuel gas injector unit. The liquid fuel supply device (and the control part) may serve, in this respect, to set a second (fuel) pressure level (liquid fuel pressure level) on the fuel gas injector unit, that is to say in the liquid fuel control part thereof.

The dual-fuel injection system furthermore preferably also comprises at least one liquid fuel injector unit. For its control and/or for the output (injection operation) of liquid fuel, the liquid fuel injector unit may likewise be supplied by the liquid fuel supply device with liquid fuel under pressure. Like the fuel gas injector unit, such a liquid fuel injector unit may likewise comprise a liquid fuel control part, and unlike the fuel gas injector unit may further comprise a liquid fuel nozzle part.

The dual-fuel injection system proposed according to the invention is characterized in that the fuel gas injector unit defines or comprises a leakage collecting space. Here a leakage path (on the fuel gas injector unit) is led via the leakage collecting space (that is to say through or extending through the latter), the leakage path extending from the liquid fuel control part into the gas nozzle part.

The leakage path in this respect comprises a first path portion, which leads from the liquid fuel control part to the leakage collecting space, wherein liquid fuel leakage can be brought into the leakage collecting space via the first path portion. (Fuel) gas leakage can enter the leakage collecting space via a second path portion of the leakage path, which extends from the leakage collecting space to the gas nozzle part. The leakage collecting space, via which the first and second path portions communicate, forms a third path portion. The leakage collecting space is preferably formed as an annular space, which in particular surrounds the gas nozzle needle, preferably in a central longitudinal area of the gas nozzle needle, for example.

The dual-fuel injection system is furthermore characterized in that it comprises a pressure regulating device, which serves for setting a defined pressure level in the leakage collecting space. That is to say it is possible, by means of the pressure regulating device, to set a third (fuel) pressure level (leakage pressure level) on the fuel gas injector unit, that is to say in the leakage collecting space thereof. The pressure regulating device may preferably comprise a pressure regulating valve, for example an active or passive valve, for setting a defined pressure level.

The pressure regulating device—which may be provided externally or internally on an injector with the fuel gas injector unit—may furthermore incorporate a communicating connection to the leakage collecting space for setting a defined pressure level in the leakage collecting space. Leakage from the leakage collecting space can also, in particular, preferably be diverted via the pressure regulating device.

The duel-fuel injection system configured in this way according to the invention advantageously allows a treatment or control of the leakage which can be variably designed—particularly taking into account the quality of any particular liquid fuel used.

For example, by setting a first defined pressure level in the leakage collecting space, which in particular exceeds a gas supply pressure level (relative excess pressure), according to the invention, liquid fuel leakage can be forced along the leakage path into the gas nozzle part and there given off together with the fuel gas (particularly in pilot ignition mode with diesel fuel; as aerosol), wherein advantageously no mixed leakage results, the ignition performance is moreover advantageously increased and no separation is necessary, which in this respect is desirable.

Alternatively, for example, when setting a second pressure level, which in particular lies below a gas supply pressure level (relative vacuum), in the leakage collecting space (particularly in pilot ignition mode with heavy oil or biofuel), liquid fuel leakage can be prevented at the inlet into the gas nozzle part, especially in connection with a diversion function of the pressure regulating valve, for example. When using liquid fuels of inferior quality, therefore, as in the case of heavy oil or biofuel, it is thereby possible, for example, to avoid a detrimental coking of the nozzle apertures of the gas nozzle part (which might otherwise occur if heavy oil (biofuel) enters the gas nozzle part).

In an especially preferred development of the proposed dual-fuel injection system—associated with advantageously simple treatment of the mixed leakage—the liquid fuel supply device comprises a low-pressure pump (pre-supply pump) and a high-pressure pump (for providing liquid fuel under high pressure).

Here the fuel injection system is adapted to introduce leakage, diverted from the leakage collecting space by means of the pressure regulating device, into a flow connection of the low-pressure pump to the high-pressure pump between these pumps.

According to this development of the dual-fuel injection system, in which the gas "caught" in the mixed leakage (from the leakage collecting space) is led directly upstream of the high-pressure pump, the gas dissolved in the leakage is advantageously (re)compressed by the high-pressure pump, at no additional structural cost. The pressure superimposed by this therefore advantageously serves to prevent the gas escaping from the liquid fuel, with the result that the liquid fuel prone to gas leakage can easily recirculate and be reused in the dual-fuel injection system and the liquid fuel supply device, particularly for liquid fuel injection processes. It is therefore advantageously possible to dispense with a cost-intensive gas separator.

In further preferred developments of the dual-fuel injection system according to the invention the leakage collecting space is formed or defined by means of one or more scraper elements, which act in opposition to the gas nozzle needle.

By means of the leakage scraper elements, the leakage quantities can be reliably carried into the leakage collecting space, where they can be caught for further use.

It is proposed within the scope of the invention to configure the dual-fuel injection system in such a way that the gas injector unit comprises a seal, which serves to seal the gas nozzle needle off from a needle guide of the gas injector unit. The seal, particularly in the form of a sealing ring, and more particularly in the form of a sliding seal, is advantageously suited, particularly in a low-pressure environment, to impeding the passage of liquid fuel leakage into the gas nozzle part on the second path portion.

It is also generally preferred in the context of the present invention that the liquid fuel control part should comprise a valve device, which is capable of interrupting and establishing the communication of the leakage path to the liquid fuel supply device. In such a development the liquid fuel control part may comprise a control chamber, from which the leakage path leads to the gas nozzle part and the valve device is capable of isolating the control chamber from the liquid fuel supply on the admission flow side. The valve device may comprise a pilot valve, for example also a further valve, for example a shut-off valve.

Furthermore, in preferred embodiments of the invention the dual-fuel injection system is a common-rail fuel injection system, wherein the liquid fuel supply device and/or the gas supply device can be implemented each in a common rail environment. It is further preferred that a respective fuel gas injector unit together with a liquid fuel injector unit should be integrated together in one dual-fuel injector, for example the fuel gas injector unit accommodated coaxially with a liquid fuel injector unit or axially parallel with one such unit in the dual-fuel injector. It is also feasible, however, to form the respective fuel gas injector unit separately from the liquid fuel injector unit.

Also proposed within the scope of the invention is a method of implementation using a dual-fuel injection system as described above.

In the method, in a first pilot ignition operating mode of the dual-fuel injection system the pressure level in the leakage collecting space is set by means of the pressure regulating device to a value greater than or equal to a gas supply pressure level (which is provided by the fuel gas supply device on the gas nozzle part) (relative constant pressure or excess pressure). This first operating mode may advantageously be provided for a diesel pilot ignition mode, for example, wherein liquid fuel leakage (diesel) is forced along the leakage path by the increased pressure level at the leakage collecting space towards the gas nozzle part, where it can consequently be given off together with the fuel gas.

In a second pilot ignition operating mode of the dual-fuel injection system according to the inventive method the pressure level in the leakage collecting space can be set by means of the pressure regulating device to a value less than a gas supply pressure level on the gas nozzle part (relative vacuum). As a result, it is possible—particularly in conjunction with a leakage drain line from the leakage collecting space—for both liquid fuel leakage and gas leakage to enter the leakage collecting space via the leakage path, and to be diverted from said space, according to the invention preferably via the pressure regulating device. This advantageously serves to prevent liquid fuel entering the gas nozzle part, where it may lead to coking of the nozzle holes (for example when operating with liquid fuel of inferior quality, such as heavy oil, for example).

In this second pilot ignition mode it is proposed, in particular, to introduce leakage diverted from the leakage collecting space into a flow connection of the liquid fuel supply device, which connects a low-pressure pump to a high-pressure pump of the liquid fuel supply device, see also above. A separation of the mixed leakage into gas and liquid fuel can thereby advantageously be eliminated.

A development of the method according to the invention furthermore proposes that in a first step, when the dual-fuel injection system is switched from a pilot ignition mode to an (exclusive) liquid fuel mode, the leakage collecting space be relieved by diverting leakage via the pressure regulating device, whilst maintaining a first gas pressure level (in particular an operating pressure level) on the gas nozzle part on the supply side, before in a second step cutting off or permanently stopping the diversion via the pressure regulating device and then in a third step reducing a gas supply pressure level to a level below the first pressure level.

Alternatively, within the scope of the method according to the invention it is possible in a first step when the dual-fuel injection system is switched from a pilot ignition mode to (exclusive) liquid fuel mode, to (continuously) establish a communicating connection of the leakage collecting space to the flow connection of the low-pressure pump to the high-pressure pump via the pressure regulating device and/or a downstream diversion line, before in a second step setting a gas supply pressure level on the gas nozzle part which is equal to or greater than the pressure level in the flow path between the low-pressure pump and the high-pressure pump.

Each particular switching as described above advantageously serves to prevent the gas nozzle part being accidentally filled with liquid fuel via the leakage path. Provision is made in this respect for interrupting the communication of the leakage path to the liquid fuel supply device (via the valve device) before the respective first step.

According to the invention an internal combustion engine of the type described at the outset is also proposed, having a dual-fuel injection system as explained above. It should be noted here that a dual-fuel injection system according to the invention may obviously comprise a plurality of fuel gas injector units (and liquid fuel injector units), wherein one or more pressure regulating devices can be assigned to the multiple fuel gas injector units.

Further features and advantages of the invention emerge from the following description of exemplary embodiments of the invention, referring to the figures of the drawings, which show details essential for the invention, and from the claims. The individual features may each be implemented severally in isolation or jointly in any combination in a variant of the invention.

Preferred embodiments of the invention are explained in more detail below with reference to the drawings attached, of which.

BRIEF DESCRIPTION OF THE DRAWING

DETAILED DESCRIPTION OF THE INVENTION

In the following description and the drawings, the same reference numerals correspond to elements of the same or comparable function.

Figure 1:
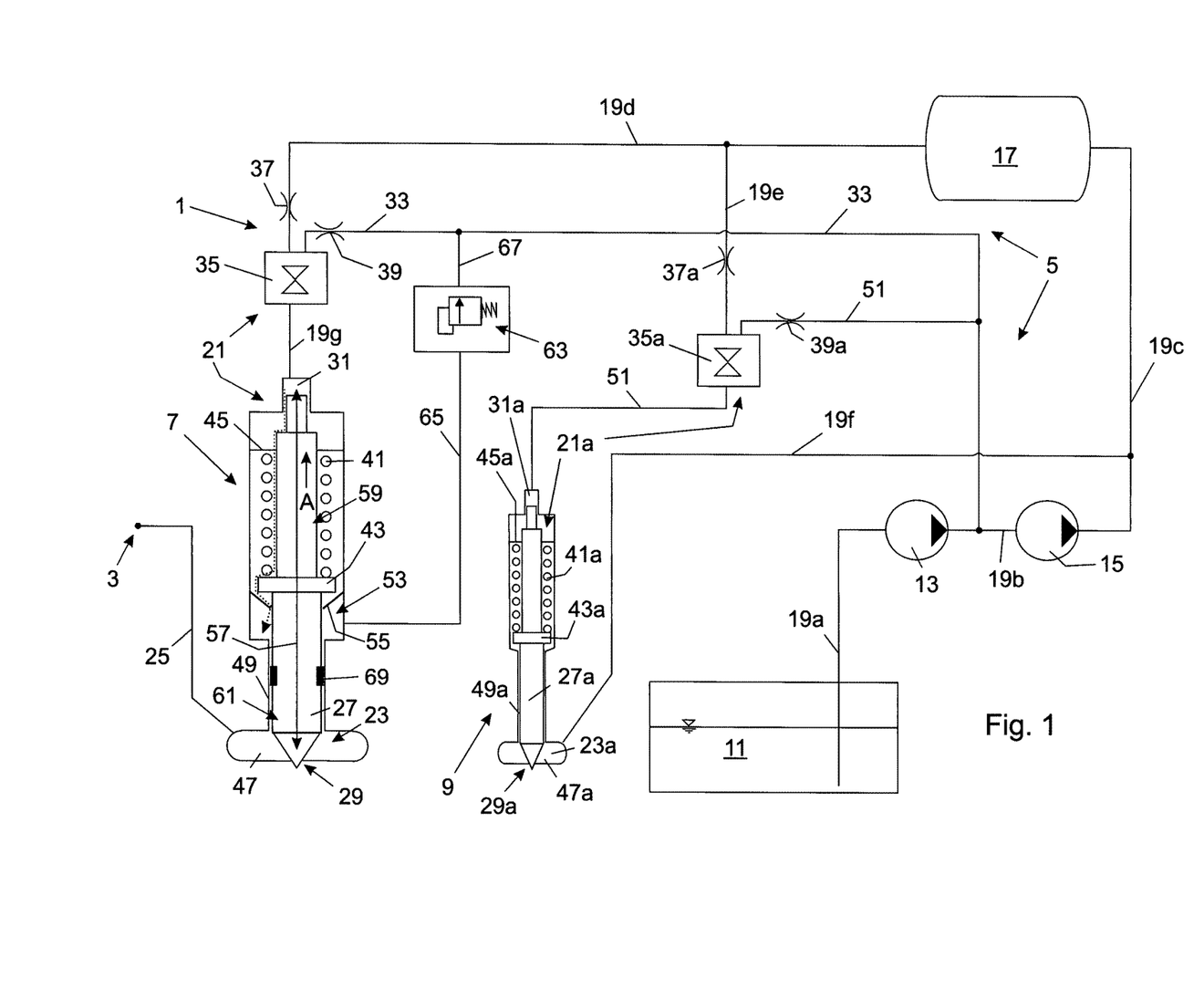
FIG. 1 in diagrammatic form shows an example of a dual-fuel injection system according to a first possible embodiment of the invention, with which the method according to the invention can be implemented.

FIG. 1 shows an example of a dual-fuel injection system 1 for an internal combustion engine.

The dual-fuel injection system 1 is adapted for operation with fuel gas, for example natural gas, biogas etc. by the pilot ignition method, for which purpose the dual-fuel injection system 1 or an internal combustion engine formed therewith comprises a fuel gas supply device 3. For providing the pilot ignition or also for operation purely on liquid fuel, in particular diesel fuel, heavy oil or biofuel (bio-oil) the dual-fuel injection system 1 or an internal combustion engine formed therewith also comprises a liquid fuel supply device 5.

The fuel gas supply device 3 is adapted to supply fuel gas, in particular at a predefined pressure level, to at least one fuel gas injector unit 7 of the dual-fuel injection system 1, for which purpose the fuel gas supply device 3 (besides a monitoring device) preferably comprises a fuel gas reservoir and a compressor unit (not shown), alternatively for example a liquid gas supply with high-pressure pump and vaporizer (not shown). When the fuel gas supply device 3 is embodied as a common rail system, the fuel gas supply device 3 may also comprise a pressurized gas collector tank (rail), from which a respective fuel gas injector unit 7 can be supplied with fuel gas.

Like the fuel gas supply device 3, the liquid fuel supply device 5 is adapted to supply liquid fuel for the pilot ignition mode or a pure liquid fuel mode to at least one liquid fuel injector unit 9 of the dual-fuel injection system 1. In addition, the liquid fuel supply device 5 is also adapted to supply liquid fuel to at least the one fuel gas injector unit 7, that is to say for controlling the latter (nozzle needle lift control).

The liquid fuel supply device 5 preferably formed as a common rail system comprises at least one liquid fuel reservoir 11 (heavy oil, bio-oil, diesel) from which a respective fuel can be drawn (where necessary also a switching device for switching between different liquid fuel reservoirs), a downstream low-pressure pump 13 and a high-pressure pump 15, in turn arranged downstream of the former, which deliver the liquid fuel subjected to high pressure by means of the pump arrangement 13, 15 into a provided rail 17 of the liquid fuel supply device 5. From the common rail 17 the liquid fuel is subsequently made available to the injector units 7, 9. For making the liquid fuel available the liquid fuel supply device 5 furthermore comprises line connections 19a,b,c,d,e,f.

A particular fuel gas injector unit 7 of the dual-fuel injection system 1 comprises a liquid fuel control part 21 (to which liquid fuel can be supplied via the liquid fuel supply device 5, line 19d) and a gas nozzle part 23, to which fuel gas can be supplied (via the fuel gas supply device 3 and a flow connection 25).

A particular liquid fuel control part 21 is intended to control the lift of a (gas) nozzle needle 27 of the associated fuel gas injector unit 7 via liquid fuel supplied to the liquid fuel control part 21, that is to say in such a way as to give off fuel gas, corresponding to an intended injection process, from a nozzle arrangement 29 (nozzle holes) of the gas nozzle part 23 into a combustion chamber.

For this purpose, a particular liquid fuel control part 21 comprises a control chamber 31, into which the introduction of liquid fuel under high pressure, provided by the liquid fuel supply device 5, can be controlled (via the flow connection 19d and a flow connection of the control part 19g) and from which the output of liquid fuel can be controlled, that is to say as leakage (via the flow connection 19g and the leakage line 33).

In the controlled input of liquid fuel into the control chamber 31 and its output therefrom, consequently controlling the lift of the gas nozzle needle 27, a pressure is set, remotely from the nozzle, on the gas nozzle needle 27 and in the fuel gas injector unit 7, that is to say a first fuel pressure level (liquid fuel pressure level), which results in a force acting on the gas nozzle needle 27 in a closing direction. For controlling the input and output of liquid fuel into/out of the control chamber 31, the liquid fuel control part 21 further comprises at least one valve device 35 (together with an inlet restrictor 37 and an outlet restrictor 39). Such a valve device 35 may preferably comprise a pilot valve, for example in the form of a 2/2-way directional control valve or a 3/2-way directional control valve. A further valve may be provided as support for the valve device 35, for example for a selective isolation from the high-pressure line 19d.

Also operatively connected to the liquid fuel control part 21 is a nozzle spring 41, which forces the gas nozzle needle 27 likewise in a closing direction (in the direction of a valve seat). The nozzle spring 41 may be supported at one end on a shoulder 43 of the gas nozzle needle 27, at the other end, for example, against a fixed guide element 45 of the gas nozzle needle 27, for example a needle guide sleeve.

The gas nozzle part 23 of the fuel gas injector unit 7 comprises a nozzle chamber 47, into which fuel gas can be introduced by the fuel gas supply device 3 at a predefined supply pressure level, that is to say at a second fuel pressure level (fuel gas pressure level) on the fuel gas injector unit 7. The gas nozzle part 23 further comprises the aforementioned gas nozzle arrangement 29, the communicating connection of which to the nozzle chamber 47 can be selectively established in controlling the lift of the gas nozzle needle 23.

Extending axially away from the gas nozzle part 23 in the fuel gas injector unit 7 towards the end thereof remote from the nozzle, an axial bore 49 is formed, in which the gas nozzle needle 27 is guided and received so that it is axially displaceable over a length.

The lift control of the gas nozzle needle 27 in a fuel gas injection mode is further explored (briefly) below.

For controlling the opening of the nozzle needle 27 from the closed position represented in FIG. 1, in which both fuel gas pressure from the nozzle chamber 47 acts in the opening direction (arrow A) in opposition to the needle 27 and the pressure from the control chamber 31 and the closing spring 41 acts in the closing direction, the closing force equilibrium on the gas nozzle needle 27 is cancelled in that the liquid fuel control part 21, by relieving the control chamber 31, reduces the closing force acting on the nozzle needle 27 (by diverting liquid fuel to the leakage line 33 via the valve device 35 and the outlet restrictor 39). As a result, the gas nozzle needle 27 lifts off from the seat and fuel gas can be discharged via the nozzle arrangement 29. To terminate an injection process, the control chamber 31 is again charged with the liquid fuel control part 21, thereby in particular terminating the diversion and refilling the control chamber 31 with fuel under high pressure. The gas nozzle needle 27 returns to its seat.

A particular liquid fuel injector unit 9 is preferably formed like the fuel gas injector unit 7 described above and preferably also follows its working principle. In allotting reference numerals, the components of the liquid fuel injector unit 9 are in this respect numbered in the same way as those of the fuel gas injector unit 7, but provided with the suffix "a".

In contrast to the gas injector unit 7, a particular liquid fuel injector unit 9 comprises a liquid fuel nozzle part 23a having a nozzle chamber 47a, to which liquid fuel under high pressure is supplied via the liquid fuel supply device 5 (line 19f). The nozzle arrangement 29a, the communication of which to the nozzle chamber 41a can be selectively established via the lift control of the nozzle needle 27a, is in this respect designed for the output of liquid fuel. Diverted leakage from the control chamber 31a is drained off into the line 33 via the flow connection 51.

With regard to the injector units 7, 9 each particular fuel gas injector unit 7 is preferably combined with a liquid fuel injector unit 9 in a single dual-fuel injector, for example in a coaxial or axially parallel arrangement in relation to the nozzle needles 23, 23a thereof.

According to the invention the fuel gas injector unit 7 defines a leakage collecting space 53. The leakage collecting space 53 is preferably formed around a longitudinally central area of the gas nozzle needle 27, that is to say preferably as an annular space, which surrounds the nozzle needle 27 in a circumferential direction. The leakage collecting space 53 is preferably defined by means of at least one scraper element 55, which acts in opposition to the gas nozzle needle 27 and is intended reliably to transfer leakage into the leakage collecting space 53, in particular also to catch it therein. This is advantageously assisted by a corresponding inclined position of at least the one scraper element 55, see FIG. 1, for example.

According to the invention a leakage path 57, which extends from the liquid fuel control part 21 into the gas nozzle part 23, is led via the leakage collecting space 53 formed in this way. The leakage path 57 here comprises a first portion 59, which leads from the control chamber 31 along the gas nozzle needle 27 through the fuel gas injector unit 7 and opens into the leakage collecting space 53, see dashed arrow in FIG. 1. The first path portion 59 is continued by a second path portion, which forms the leakage collecting space 53, which second path portion 53 is in turn continued by a third path portion 61, which leads from the leakage collecting space 53 (along the axial bore 49 and the gas nozzle needle 27) into the gas nozzle part 23, in particular into the gas nozzle chamber 47. In this respect the liquid fuel control part 21 and the gas nozzle part 23 communicate with one another via the leakage path 53.

As is further illustrated in FIG. 1, for example, the dual-fuel injection system 1 further comprises a pressure regulating device 63, which serves for setting a defined pressure level in the leakage collecting space 53, that is to say a third fuel pressure level on the fuel gas injector unit 7 (leakage pressure level). This advantageously affords a variable leakage guide on the gas injector unit 7.

For example, the pressure regulating device 63 may set a pressure level at the leakage collecting space 53, which in a pilot ignition mode using diesel fuel, for example, exceeds the fuel gas pressure level in the gas nozzle part 23. Here liquid fuel leakage entering the leakage collecting space 53 via the first path portion 59 is transported away towards the gas nozzle part 23, where it is also advantageously given off in the form of an aerosol (increasing the ignition performance of the fuel gas). This advantageously obviates the need for any treatment of mixed leakage.

The pressure regulating device 63 preferably comprises a pressure regulating valve, for example an active (controlled) or passive pressure regulating valve. The pressure regulating device 63 furthermore preferably comprises a communicating connection 65 to the leakage collecting space 53, for setting a defined pressure level in the leakage collecting space 53. The pressure regulating device 63 is preferably provided as a separate device in the dual-fuel injection system 1, for example for one single unit or a plurality of fuel gas injector units 7.

In preferred embodiments of the dual-fuel injection system 1 the pressure regulating device 63 is also adapted in particular to diverting leakage from the leakage collecting space 53. A diverting line 67 (33), communicating in particular with the liquid fuel low-pressure side, is here preferably assigned to the pressure regulating device 63. The facility for drawing off leakage from the leakage collecting space 53 via the pressure regulating device 63 advantageously expands the scope for leakage treatment in the dual-fuel injection system 1.

It is especially preferred, as is also represented in FIG. 1, if the dual-fuel injection system 1 is advantageously adapted to introducing leakage from the leakage collecting space 53, which in particular is diverted by means of the pressure regulating device 63, into the flow connection 19b of the low-pressure pump 13 to the high-pressure pump 15 between these pumps. This development of the invention makes it possible to "catch" mixed leakage formed in the leakage collecting space 53 in the fuel circuit of the liquid fuel supply device 5 under a pressure which is necessary in order to prevent a degassing of the (mixed leakage) fuel gas from the liquid fuel (and to allow a rapid dissolving of the gas in the liquid fuel), and to allow recirculation of the fuel gas from the mixed leakage so that it can also be given off through the injector units 9. This likewise advantageously obviates the need for treatment of the mixed leakage, for example by gas separation. This is particularly advantageous considering that, with the proposed introduction between the low-pressure pump 13 and the high-pressure pump 15, the mixed leakage needs to have only a low-pressure pressure level which is slightly in excess of that on the delivery side of the low-pressure pump 13. Advantageously, such a pressure level can readily be adjusted by means of the pressure regulating device 63.

In further, preferred developments of the dual-fuel injection device 1 a particular gas injector unit 7 comprises a seal 69, which serves to seal the gas nozzle needle 27 off from the needle guide (axial bore 49). Such a seal 69, designed in particular as a sliding seal, is capable, particularly in low-pressure environments, of advantageously preventing or at least significantly reducing the overflowing quantities of leakage.

According to the invention a method is also proposed, which is explained in more detail below, for implementing the dual-fuel injection system 1 described above.

In the method, in a first pilot ignition operating mode of the dual-fuel injection system 1, in particular a pilot ignition operating mode using pilot ignition fuel in the form of diesel fuel, the pressure level in the leakage collecting space 53 is here set by means of the pressure regulating device 63 to a value greater than or equal to a gas supply pressure level on the gas nozzle part 23. This relative constant pressure or excess pressure setting, which may lie in the range from 0 to 10 bar, for example, serves on the one hand to prevent fuel gas entering the leakage collecting space 53 via the third path portion 61, and on the other to force the liquid fuel leakage (fed into the leakage collecting space 53 by the liquid fuel control part 21 via the first path portion 59) into the gas nozzle part 23 so that it can also be given off through the fuel gas injector unit 7 (thereby advantageously increasing the ignition performance of the fuel gas, particularly in a diesel pilot ignition mode).

According to the method in a second pilot ignition operating mode of the dual-fuel injection system 1, in particular a pilot ignition operating mode using pilot ignition fuel in the form of heavy oil or bio-oil (which has an inherently inferior quality compared to diesel fuel), the pressure level in the leakage collecting space 53 is set by means of the pressure regulating device 63 to a value less than a gas supply pressure level on the gas nozzle part 23.

According to this method of operation, in which the leakage collecting space 53 is subjected to a relative vacuum, which may lie in the range up to 10 bar, the formation of mixed leakage in the leakage collecting space 53 is allowed, but it is advantageously possible—particularly where the mixed leakage is diverted (preferably via the pressure regulating device 63)—to prevent liquid fuel getting into the gas nozzle part 23, therefore leading to a detrimental coking of the nozzle apertures 29. Here the mixed leakage is more preferably diverted into the flow connection 19b of the low-pressure pump 13 to the high-pressure pump 15 between these pumps.

According to a first aspect of the method according to the invention, in a first step when the dual-fuel injection system 1 is switched from a pilot ignition mode to a pure liquid fuel mode, the leakage collecting space 53 is relieved via the pressure regulating device 63 (diversion of leakage), wherein a first gas supply pressure level (in particular a high-pressure level) is maintained on the gas nozzle part 23. The first step is preferably preceded by a shutting-off of the liquid fuel supply to the control chamber 31, that is to say an isolation of the leakage path 57 from the liquid fuel high-pressure circuit 19d, for which purpose the valve device 35 is provided.

It is therefore possible to ensure that after diversion of the leakage the leakage collecting space 53 is now only filled with fuel gas. In a second step the diversion via the pressure regulating device 63 can then be cut off or permanently stopped. In a third step the fuel gas supply pressure level can now be reduced to a pressure below the first gas supply pressure level, in particular to a low-pressure level. An accidental filling of the gas nozzle part 23 with (residual) liquid fuel (remaining in the collecting space 53) can hereby advantageously be prevented, assisted in particular by the seal 69 functioning reliably in the low-pressure environment now produced.

Alternatively, according to a second aspect of the method, in a first step when the dual-fuel injection system 1 is switched from a pilot ignition mode to a pure liquid fuel mode, a communicating connection of the leakage collecting space 53 to the flow connection 19b of the low-pressure pump 13 to the high-pressure pump 15 may be (continuously) established via the pressure regulating device 63. The first step is preferably preceded by a shutting-off of the liquid fuel supply to the control chamber 31, that is to say an isolation of the leakage path 57 from the liquid fuel high-pressure circuit 19d, for which purpose the valve device 35 is provided.

In a succeeding second step a gas supply pressure level is now set on the gas nozzle part 23 which is equal to or greater than the pressure level in the flow path 19b between the low-pressure pump 13 and the high-pressure pump 15.

According to this aspect of the method it is in turn advantageously possible to prevent the gas nozzle part 23 filling with liquid fuel, that is to say maintaining a slightly higher pressure (for example Δp=5 bar) at the leakage collecting space 53 than on the delivery side of the low-pressure pump 13 ensures that on the one hand any liquid fuel leakage is continuously diverted, and that on the other no fuel can enter the leakage collecting space 53 in a reverse direction from the pressure regulating device 63.

For the purposes of the invention the pressure in the flow connection 19b between the low-pressure pump 13 and the high-pressure pump 15 may correspond to a pressure level of approximately 5 to 15 bar, for example. The supply gas pressure may lie in the range of 300-350 bar, for example; the high-pressure level of the liquid fuel supply device 5 may lie in the range of 2000-2500 bar, for example.

Some further examples of possible developments of the pressure regulating device 63 are represented below.

Figure 2:
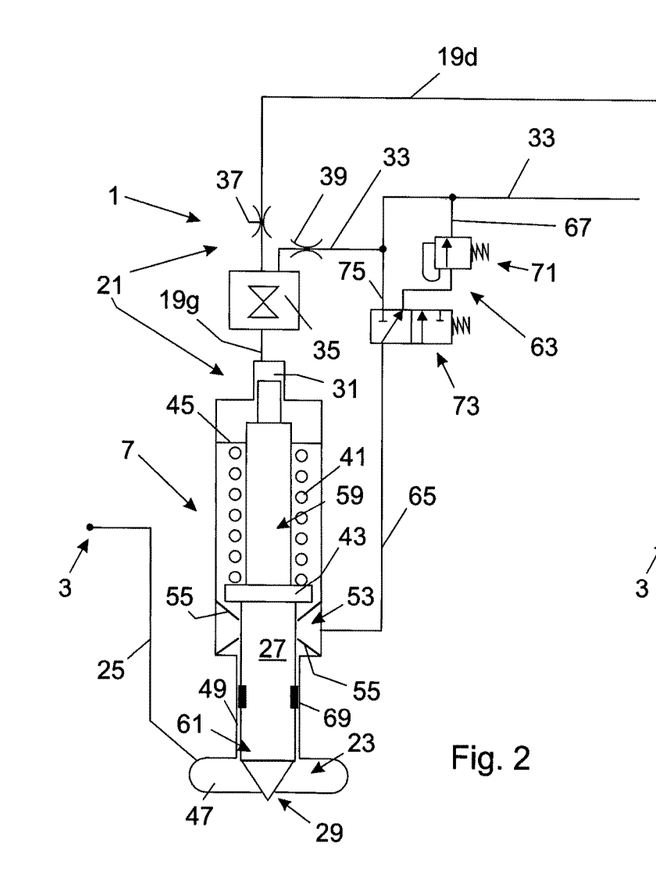
FIG. 2 in diagrammatic form and by way of example shows a view of the dual-fuel injection system illustrating the fuel gas injector with a pressure regulating device of a further possible development.

FIG. 2 illustrates a possible development of the dual-fuel injection system 1, according to which the pressure regulating device 63 (in addition to a pressure regulator 71 or pressure reducer) also comprises a 3/2-way directional control valve 73, which serves to control the communicating connection 65 of the pressure regulating device 63 to the leakage collecting space 53. Besides activating the pressure regulator 71 in the switch position shown, an (abrupt) relief of the leakage collecting space 53 is allowed here through selective opening of a bypass branch 75, 33 (further switch position). Such a pressure regulating device 63 allows switching as described above, for example according to the second aspect of the method.

Figure 3:
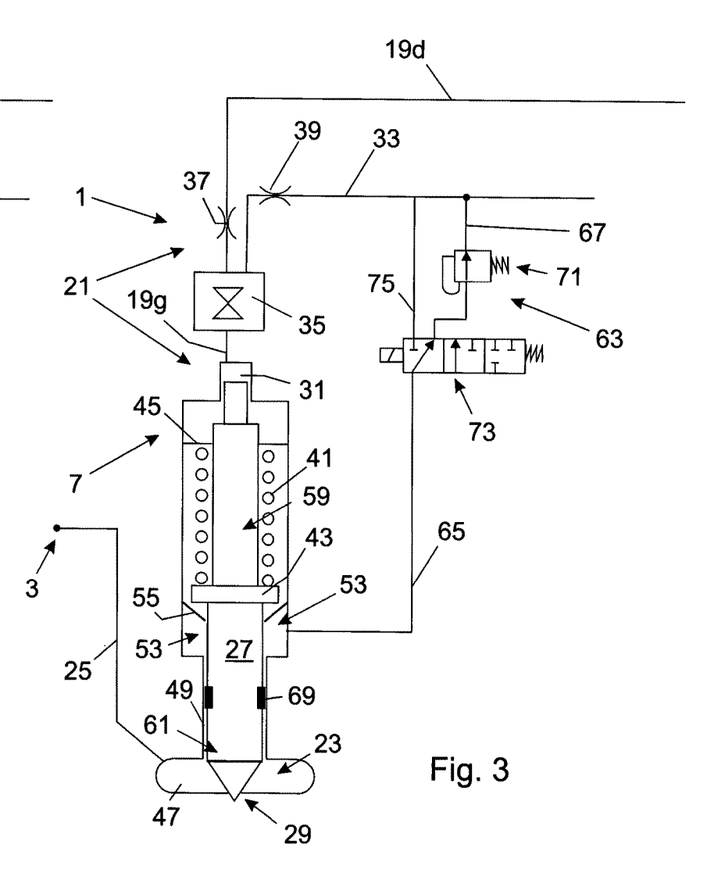
FIG. 3 in diagrammatic form and by way of example shows a view of the dual-fuel injection system illustrating the fuel gas injector with a pressure regulating device of yet another possible development.

FIG. 3 shows a variant of the pressure regulating device 63, which instead of the 3/2-way directional control valve described above comprises a 3/3-way direction control valve 73. Besides relieving and activating the pressure regulator 71, it is hereby also possible to cut off the diversion of leakage by shutting off the communicating connection 65. A pressure regulating device 63 configured in this way allows switching as described above, for example also according to the first aspect of the method.

The invention claimed is:

1. A dual-fuel injection system, comprising: a fuel gas supply device;
a liquid fuel supply device;
a fuel gas injector unit having a liquid fuel control part and a gas nozzle part, to which fuel gas is supplied,
wherein the fuel gas injector unit includes a gas nozzle needle having a lift that is controllable by liquid fuel supplied to the liquid fuel control part, wherein
the fuel gas injector unit defines a leakage collecting space, via which a leakage path is led that extends from the liquid fuel control part into the gas nozzle part; and
a pressure regulating device that serves for setting a defined pressure level in the leakage collecting space, wherein the liquid fuel control part comprises a valve device that interrupts and establishes communication of the leakage path to the liquid fuel supply device on an admission flow side, and wherein the liquid fuel control part comprises a control chamber, from which the leakage path leads to the gas nozzle part, the valve device being operative to isolate the control chamber from the liquid fuel supply device on the admission flow side.

2. The dual-fuel injection system as claimed in claim 1, wherein the pressure regulating device comprises a communicating connection to the leakage collecting space for setting a defined pressure level in the leakage collecting space.

3. The dual-fuel injection system as claimed in claim 1, wherein the pressure regulating device is adapted to diverting leakage from the leakage collecting space.

4. A dual-fuel injection system, comprising: a fuel gas supply device;
a liquid fuel supply device;
a fuel gas injector unit having a liquid fuel control part and a gas nozzle part, to which fuel gas is supplied,
wherein the fuel gas injector unit includes a gas nozzle needle having a lift that is controllable by liquid fuel supplied to the liquid fuel control part, wherein
the fuel gas injector unit defines a leakage collecting space, via which a leakage path is led that extends from the liquid fuel control part into the gas nozzle part; and
a pressure regulating device that serves for setting a defined pressure level in the leakage collecting space, wherein the liquid fuel supply device comprises a low-pressure pump and a high-pressure pump, wherein the dual-fuel injection system is adapted to introduce leakage diverted from the leakage collecting space into a flow connection of the low-pressure pump to the high-pressure pump between the pumps.

5. The dual-fuel injection system as claimed in claim 1, wherein the leakage collecting space is formed by at least one scraper element that acts in opposition to the gas nozzle needle.

6. The dual-fuel injection system as claimed in claim 1, wherein the gas injector unit comprises a seal arranged to seal off the gas nozzle needle from a needle guide of the gas injector unit.

7. The dual-fuel injection system as claimed in claim 1, further comprising at least one liquid fuel injector unit.

8. The dual-fuel injection system as claimed in claim 4, wherein the liquid fuel control part comprises a valve device that interrupts and establishes communication of the leakage path to the liquid fuel supply device on an admission flow side.

9. The dual-fuel injection system as claimed in claim 8, wherein the liquid fuel control part comprises a control chamber, from which the leakage path leads to the gas nozzle part, the valve device being operative to isolate the control chamber from the liquid fuel supply device on the admission flow side.

10. A method for implementing a dual-fuel injection system as claimed in claim 1, comprising
setting, in a second pilot ignition operating mode of the dual-fuel injection system, the pressure level in the leakage collecting space using the pressure regulating device to a value less than a gas supply pressure level on the gas nozzle part.

11. A method for implementing a dual-fuel injection system as claimed in claim 1, comprising the steps of:
setting, in a first pilot ignition operating mode of the dual-fuel injection system, the pressure level in the leakage collecting space using the pressure regulating device to a value at least equal to a gas supply pressure level on the gas nozzle part; and/or
setting, in a second pilot ignition operating mode of the dual-fuel injection system, the pressure level in the leakage collecting space using the pressure regulating device to a value less than a gas supply pressure level on the gas nozzle part, wherein in a first step when the dual-fuel injection system is switched from a pilot ignition mode to a liquid fuel mode, the leakage collecting space is relieved by diverting leakage via the pressure regulating device, while maintaining a first gas pressure level on the gas nozzle part on the supply side;

in a second step the diversion via the pressure regulating device is cut off; and in a third step a gas supply pressure level is reduced to a level below the first gas pressure level.

12. A method for implementing a dual-fuel injection system as claimed in claim 1, comprising the steps of: setting, in a first pilot ignition operating mode of the dual-fuel injection system, the pressure level in the leakage collecting space using the pressure regulating device to a value at least equal to a gas supply pressure level on the gas nozzle part; and/or setting, in a second pilot ignition operating mode of the dual-fuel injection system, the pressure level in the leakage collecting space using the pressure regulating device to a value less than a gas supply pressure level or the gas nozzle part, wherein in a first step when the dual-fuel injection system is switched from a pilot ignition mode to liquid fuel mode, a communicating connection of the leakage collecting space to the flow connection of a low-pressure pump to a high-pressure pump is established via the pressure regulating device; and in a second step a gas supply pressure level is set on the gas nozzle part that is at least equal to the pressure level in the flow path between the low-pressure pump and the high-pressure pump.

13. The method as claimed in claim 11, wherein before the respective first step the communication of the leakage path to the liquid fuel supply device is interrupted on the admission flow side.

14. The method as claimed in claim 12, wherein before the respective first step the communication of the leakage path to the liquid fuel supply device is interrupted on the admission flow side.

15. An internal combustion engine comprising a dual-fuel injection system as claimed in claim 1.

\* \* \* \* \*